US012575663B2

(12) United States Patent
Castex et al.

(10) Patent No.: US 12,575,663 B2
(45) Date of Patent: Mar. 17, 2026

(54) APPLICATOR FOR COSMETIC PRODUCT COMPRISING A MOVABLE PART HAVING AT LEAST ONE CHAIN OF OPEN LOOPS

(71) Applicant: CHANEL PARFUMS BEAUTE, Neuilly-sur-Seine (FR)

(72) Inventors: Nicolas Castex, Neuilly sur Seine (FR); Marie Lamoureux, Neuilly sur Seine (FR); Carole Chapelat, Biel/Bienne (CH); Antoine Bonadei, Biel/Bienne (CH)

(73) Assignee: CHANEL PARFUMS BEAUTE, Neuilly-sur-Seine (FR)

( * ) Notice: Subject to any disclaimer, the term of this patent is extended or adjusted under 35 U.S.C. 154(b) by 400 days.

(21) Appl. No.: 18/112,850

(22) Filed: Feb. 22, 2023

(65) Prior Publication Data

US 2023/0263295 A1    Aug. 24, 2023

(30) Foreign Application Priority Data

Feb. 23, 2022    (FR) ........................................ 2201610

(51) Int. Cl.
*A46B 7/06* (2006.01)
*A45D 40/26* (2006.01)
(Continued)

(52) U.S. Cl.
CPC .............. *A46B 7/06* (2013.01); *A45D 40/262* (2013.01); *A46B 9/021* (2013.01); *A46D 1/0238* (2013.01);
(Continued)

(58) Field of Classification Search
CPC .... A46B 7/06; A46B 3/04; A46B 5/02; A46B 9/021; A46B 15/00; A46B 2200/1053;
(Continued)

(56) References Cited

U.S. PATENT DOCUMENTS 6,295,994 B1 * 10/2001 Thayer ................... A46B 9/021
                                                      132/218
2016/0302554 A1 * 10/2016 Berhault ................ A46B 9/021
(Continued)

FOREIGN PATENT DOCUMENTS

FR          3 090 301 A1      6/2020
WO      WO-2018210695 A1 * 11/2018 ........... A45D 34/042
(Continued)

OTHER PUBLICATIONS

Preliminary Search Report from French family member Application No. 2201610, Search Report and Written Opinion, mailed Aug. 4, 2022.

*Primary Examiner* — Tatiana L Nobrega
*Assistant Examiner* — Lina Faraj
(74) *Attorney, Agent, or Firm* — GREENBLUM & BERNSTEIN, P.L.C.

(57) ABSTRACT

Applicator for cosmetic product having an elongate general shape in a longitudinal direction, including a fixed part and a part movable in relation thereto. The movable part includes protrusions, at least one chain having a strand forming a succession of open loops, the chain extending substantially parallel to the longitudinal axis of the applicator. The fixed part includes at least two links, at least two of the open loops on each chain being passed through by a link of the fixed part. Thus, each chain of the movable part is fastened with at least one degree of freedom to the fixed part, enabling relative movement of the chain in relation to the fixed part longitudinally. This improves quality of the application of the product and gives the applicator a sensation of flexibility, even if the applicator is constituted by a rigid material. The applicator can be made by additive manufacturing.

14 Claims, 3 Drawing Sheets

(51) Int. Cl.

| | |
|---|---|
| *A46B 3/04* | (2006.01) |
| *A46B 9/02* | (2006.01) |
| *A46D 1/00* | (2006.01) |
| *B29C 64/153* | (2017.01) |
| *B29L 31/42* | (2006.01) |
| *B33Y 80/00* | (2015.01) |

(52) U.S. Cl.
CPC ............ *B29C 64/153* (2017.08); *B33Y 80/00* (2014.12); *A46B 2200/1053* (2013.01); *B29L 2031/42* (2013.01)

(58) Field of Classification Search
CPC ............ A46B 2200/106; A45D 34/042; A45D 34/045; A45D 34/046; A45D 40/262; A45D 40/265; A45D 40/267; A46D 1/0253; A46D 1/0284; A46D 1/0238
See application file for complete search history.

(56) References Cited

U.S. PATENT DOCUMENTS

| | | | | |
|---|---|---|---|---|
| 2020/0245751 | A1 * | 8/2020 | Thenin | ................. A45D 40/262 |
| 2020/0281345 | A1 * | 9/2020 | Salciarini | ............. A46D 1/0207 |
| 2021/0186183 | A1 * | 6/2021 | Crapet | .................. A46B 9/005 |
| 2023/0022223 | A1 | 1/2023 | Castex | |

FOREIGN PATENT DOCUMENTS

| | | | | |
|---|---|---|---|---|
| WO | WO-2020127727 A1 * | 6/2020 | .......... A45D 34/045 |
| WO | 2021/058211 A1 | 4/2021 | |

* cited by examiner

APPLICATOR FOR COSMETIC PRODUCT COMPRISING A MOVABLE PART HAVING AT LEAST ONE CHAIN OF OPEN LOOPS

BACKGROUND

1. Field of the Invention

The present invention relates to the field of applicators for cosmetic product. It concerns in particular an applicator configured for the application of a cosmetic product such as a mascara to hairs such as the eyelashes or eyebrows. Such an applicator for cosmetic product is designated by the expression "mascara applicator" or simply "applicator" in the present document.

2. Description of the Background

Such an applicator is generally a constituent part of an item of mascara. An item of mascara conventionally comprises a case, a mascara reservoir and an applicator brush. The applicator brush comprises a part for gripping and an applicator proper, which generally takes the form of a brush.

The applicator brush may comprise or form, in known manner, a cap or plug configured to close off the reservoir when mascara is not being applied. The cap may form the gripping part of the brush applicator.

Conventionally, several types of applicator exist, those of "bottle brush" type, those that are injection molded and those produced by additive manufacturing (sometimes called "additive manufacture"). Additive manufacturing designates the processes of manufacture by addition or aggregation of material.

An applicator of bottle brush type comprises a brush which has bristles formed by fibers trapped in a twisted metal wire forming the core of the applicator. An injection-molded applicator is generally formed of one piece and comprises bristles or teeth of plastic material for example, generally called protrusions. An applicator obtained by additive manufacturing is generally a single piece too and may be formed for example from a powder of thermoplastic polymers via a process implementing for example powder melting by laser.

Whatever the form and the embodiment of a known mascara applicator, the principle of application of the product consists of loading the applicator with cosmetic product (with mascara) contained in the reservoir, of extracting the applicator from said reservoir, the protrusions of the applicator being loaded with product, and performing the application on the user's eyelashes or eyebrows.

In the interest of simplicity, the user is considered as female in the rest of the document, without excluding that the item and/or the applicator may be used by a male user.

In the interest of simplicity, reference is also made only to eyelashes below in the present document, without however excluding use of the product and of the applicator to the user's eyebrows.

Known brushes, whether they be of bottle brush type, of injected plastic material, or obtained by additive synthesis, are capable of providing good makeup results. Nevertheless, improvements in the product application result and in the comfort of use for the user are still sought after. It is thus desirable to design applicators having a good capacity for retaining cosmetic product, that lead to good separation of the eyelashes, a good effect of elongation and/or of curving the eyelashes. Similarly, it is sought to configure the applicator to provide the best possible application quality, in particular the best regularity, with simple manipulation.

Document WO2021/058211 presents an applicator for cosmetic product comprising a longitudinal core forming cavities in which are included movable parts which bear protrusions. Such an applicator improves the application of the product on the eyelashes. However, this applicator does not enable a result to be obtained that is similar to that obtained by a professional make-up artist, who combs the eyelashes not only in their direction of disposition but also with slight transverse back-and-forth movements, referred to as "zigzag" movements. The presence of small movable blocks creates zones in which all the protrusions of the zone considered are movable together such that there is no adaptation of the distance between the protrusions in those zones. Furthermore, there is no coherency in the movement of the different movable parts. This may result in imperfect application, with in particular clumping of cosmetic product. Furthermore, this applicator is particularly complex to produce and, on account of its configuration, the cavities it comprises are liable to become rapidly clogged by the cosmetic product, such that the applicator rapidly loses the advantages of the presence of movable parts. Furthermore, the applicator proposed in that document has a geometry which makes it rigid and perceived as such on application of the product.

SUMMARY

The present invention is thus directed to providing an applicator for cosmetic product, in particular a mascara applicator, which improves the existing applicators in relation to at least one of the aspects set out above.

The invention thus relates to an applicator for cosmetic product having an elongate general shape and extending along a longitudinal axis defining a longitudinal direction. The applicator comprises a fixed part, configured to be rigidly connected to a grip part or formed as a single unit with said grip part, and a part that is movable relative to the fixed part. The movable part comprises protrusions. The movable part comprises at least one chain comprising a strand forming a succession of open loops, said chain extending substantially parallel to the longitudinal axis. The fixed part comprises at least two links, at least two of said open loops on each chain being passed through by a link of the fixed part. Thus each chain of the movable part is fastened with at least one degree of freedom to the fixed part, enabling relative movement of the chain in relation to the fixed part in the longitudinal direction.

The freedom of movement of the movable part makes the application of the cosmetic product more pleasant. As a matter of fact, even if the applicator is formed from relatively hard plastics materials, which is in particular the case if it is formed by additive manufacturing, the mobility of part of the applicator enables the protrusions it carries to gently penetrate the fringe of the eyelashes, by partly adapting to the position of the user's eyelashes.

Furthermore, it has been found that the application of the cosmetic product, in particular a mascara, with an applicator in accordance with the present invention, was, in some configurations of the invention, carried out in two phases. First, the interstices between the protrusions, loaded with product, unload in contact with the eyelashes. This frees the movable part (the movement of which is initially limited by the product carried by the applicator), which makes it possible to comb the eyelashes more effectively than an applicator of similar configuration without a movable part carrying protrusions. In particular, the longitudinal movement of the movable part makes it possible to obtain the effect of making-up similar to that achieved by a professional, who combs the eyelashes not only in their direction of disposition but also with slight transverse back-and-forth movements. For a mascara, this improves its curving, elongating and volume-generating effects.

The configuration of the movable part, in the form of chains of open loops, procures high mobility and increased flexibility of the movable part, which increase the advantages described above.

In general terms, the presence of a movable part makes it possible to locally modify the density of the protrusions, which, according to the movement of the user at the time of the application, makes it possible to modulate the result of that application. The applicator provided according to the present invention thus potentially makes it possible to produce the effects of different brushes.

According to some embodiments, each chain of the movable part forms a first row of open loops and a second row of open loops, the first row of open loops being formed in a first plane parallel to the longitudinal axis, the second row of open loops being formed in a second plane parallel to the longitudinal axis, distinct from said first plane.

The chains of the movable part may be two in number.

With this configuration, the movable protrusions may be obtained in all the radial directions with only two movable chains.

The fixed part may comprise a central core extending along the longitudinal axis.

The central core, which may in particular be straight, gives the applicator a certain transverse rigidity. It advantageously serves as a bearing structure and longitudinal guide for the movable part. If required, it also serves as a guide for the pivoting of the chains of the movable part around the longitudinal axis.

The central core may comprise a first end and a second end, the first end and the second end each bearing at least one link.

The connection between the fixed part and the chains of the movable part may thus be limited to the two ends of the core. This enables the chains of the movable part to be not only movable longitudinally, to a certain extent, but also to curve, and deform, between those two connection points. The flexibility of the applicator experienced by its user and the comfort of the application are thus increased.

The central core may carry at least one row of links extending over a whole length of the central core, in the longitudinal direction, and is configured such that each loop of each chain of the movable part is passed through by two links.

In such a configuration, the movable part may be connected, with some freedom, over the whole length of the central core, or, for example, over a whole length of the applicator. This improves the guiding of the movable part.

At least one longitudinal portion of the fixed part of the applicator may comprise one or more strands each forming a chain of open links interlaced with at least some of the open loops of the movable part.

The chains of the movable part and the chains of the fixed part may have a same configuration.

A fixed part partly constituted by strands of open links has high flexibility, in particular in the transverse direction. This flexibility provided by a particular geometric configuration may for example make it possible to compensate for the inherent rigidity of the material used to form the applicator.

The fixed part of the applicator may carry protrusions. The protrusions, of not only the movable part, but also, if required, of the fixed part, may be oriented substantially perpendicularly to the longitudinal axis. The protrusions of the fixed part may differ in size and/or shape from the protrusions of the movable part.

Each protrusion may for example be substantially cylindrical or prismatic and may for example have a length comprised between 0.2 mm and 0.5 mm for example between 0.24 mm and 0.40 mm.

The protrusions of each of the parts of the applicator may thus have different effects on the application of the cosmetic product. For example, an alternation between long protrusions and short protrusions may increase the product retention capacity of the applicator, and increase its capacity to separate the eyelashes on application of the product. Long protrusions have better capacity to comb the eyelashes. The general shape of the protrusions makes it possible to modulate their properties. For example, the protrusions may have an elongate shape of fixed cross-section (they are then prismatic or cylindrical) or of variable cross-section.

Each protrusion may comprise a free end remote from the longitudinal axis, said applicator being inscribed within an outer envelope defined by the free ends of the protrusions, said envelope being substantially cylindrical and of a diameter comprised between 6 mm and 10 mm, for example between 7 mm and 9 mm, such as 8 mm.

Such an outer geometric envelope of the applicator makes it effective for the application of the cosmetic product and pleasant to use.

The fixed part of the applicator may be produced from polyamide, for example polyamide 11, or from polypropylene.

The movable part of the applicator may be produced from polyamide, for example polyamide 11, or from polypropylene.

The applicator may thus be constituted by a single material or by two distinct materials. Plastics materials that are suitable to be used in a method for additive manufacture of the applicator are preferred. As a matter of fact, the applicator is advantageously produced using an additive manufacturing method (or "3D printing"), which makes it possible to obtain complex forms linked to the mobility of the movable part, in particular the open loop forms it comprises.

The invention also relates to a method for manufacturing an applicator as described above, said method comprising a step of powder bed fusion of a plastics material.

Still other features and advantages of the invention will appear in the following description.

BRIEF DESCRIPTION OF THE DRAWING

In the accompanying drawings, given by way of non-limiting example.

DETAILED DESCRIPTION

Figure 1:
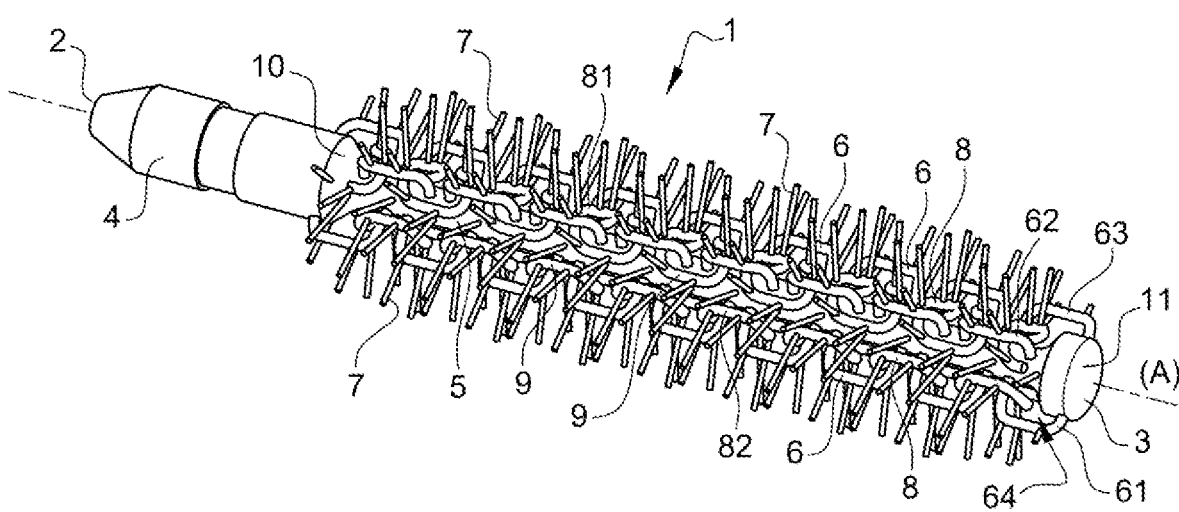
FIG. 1 shows, in a diagrammatic view in three dimensions, an applicator in accordance with an embodiment of the invention.

The applicator of FIG. 1 is of elongate form, and extends along a longitudinal axis A which forms the main axis of the applicator. The applicator 1 of FIG. 1 is thus formed between a first end 2 configured to be connected to a grip part in order to form an applicator brush and a second end 3 which is free. In particular, the first end is formed at the tip of a joining member 4 configured to be connected to a grip part. According to some embodiments of the invention not shown, the grip part may be formed as a single unit with the actual applicator.

The applicator 1 of FIG. 1 comprises a central core 5 (which may also be designated "central body"). The central core 5 is a straight member which extends, in this embodiment, between the joining member 5 and the second end 3 of the applicator. The central core 5 advantageously has the form of a cylindrical rod. Links 6 are formed on the core. The links 6 are aligned into one or more rows of links. In the example embodiment shown here, the applicator 1 comprises four rows of links, that is to say a first row 61, a second row 62, a third row 63 and a fourth row 64. In this example, the rows of links are formed pairwise in planes that are oriented at 90° to each other and that intersect with the longitudinal axis A. In other words, the rows 61, 62, 63, 64 are regularly distributed around the longitudinal axis A. The links 6 advantageously (but not necessarily) comprise protrusions 7. The protrusions 7 are described in more detail below.

The central core and the links 6 associated with it form a part referred to as fixed part of the applicator 1.

The applicator 1 further comprises a movable part. The movable part is formed by at least one chain 8 constituted by a strand forming a succession of open loops 9.

In the present embodiment, the applicator 1 comprises two chains, that is to say a first chain 81 and a second chain 82.

Figure 2:
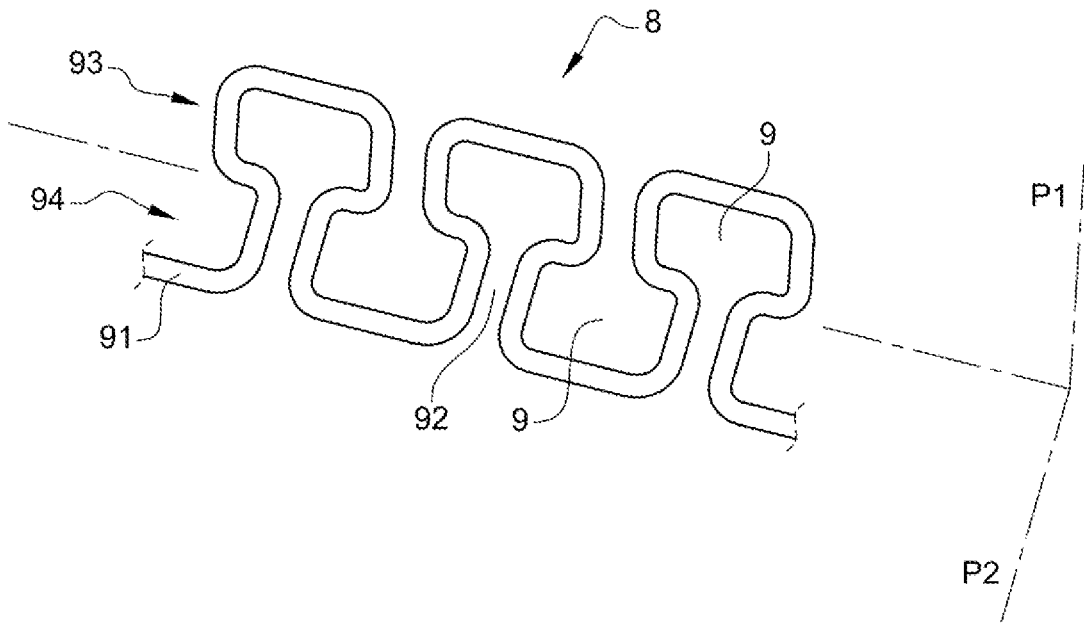
FIG. 2 represents, in a concept diagram, a chain used in the applicator of FIG. 1.

An example of chain geometry that may be used in the context of the present invention is shown in FIG. 2. The protrusions 7 carried by the chain 8 have been omitted in FIG. 2 in order to better understand the general configuration of the chain 8.

The chain 8 thus comprises a strand 91 which comprises a succession of curves and segments forming loops 9. The loops 9 are open, that is to say that the perimeter of each loop is not closed and provides an opening 92. The chain 8 is formed of two rows 93, 94 of open loops, the first row 93 and the second row 94 being substantially formed in the planes P1, P2 which are at right angles to each other.

In the example embodiment of FIG. 1, each loop 9 of each row is passed through by two successive links 6 of a same row of links of the applicator. The chain 8 is thus connected to the fixed part of the applicator, with a certain freedom of movement. In particular, according to the invention, the chain 8 can move at least longitudinally (that is to say parallel to the longitudinal axis A) relative to the fixed part. With a regular distribution of the links 6 along the central core 5, and loops 9 of same dimensions, the maximum value of this longitudinal movement matches the inside dimension of a loop 9 in the longitudinal direction less the distance between two successive links, including the thickness of the two links.

In the example embodiment shown, a certain movement of each chain in the other directions is also possible, on account of the "floating" mounting of each chain on the fixed part, obtained by interlacing of the loops 9 and of the links 6. This freedom of movement gives greater apparent flexibility for the applicator, that is to say that the user has the sensation of using a flexible applicator even if it is constituted by a rigid material.

The movable part, here constituted by two chains 8, carries protrusions 7. The protrusions 7 advantageously have an orientation substantially perpendicular to the longitudinal axis A, and preferably a radial orientation, that is to say in a direction perpendicular to and intersecting with the longitudinal axis A.

Alternatively, the protrusions may have different angles of disposition, for example to follow the movement of application and/or to promote the retention of the cosmetic product.

The protrusions 7, whether they are comprised by the chains 8 of the movable part or by the fixed part and in particular the links 6, may have various geometries. The protrusions 7 fulfill several functions, in particular a function of retaining the cosmetic product, a function of application of that product onto the eyelashes, a function for separating the eyelashes, and a combing function. The configuration of the protrusions is optimized in order for them to conjointly fulfill those functions. All the protrusions may thus have the same configuration, or different configurations. In the example represented here, the protrusions are right cylindrical, of small diameter. They are like rigid bristles. Prismatic protrusions having a square, rectangular, oval etc. section may of course be envisioned. Similarly, protrusions that are conical, frusto-conical, pyramidal, or of any other non-uniform section may be envisioned.

A first group of protrusions 71 is carried by the chains of the movable part. A second group of protrusions 72 is carried by the links of the fixed part. Lastly, a third group of protrusions is carried by the central core 5.

The protrusions of these three groups have identical cross-sections, but different lengths, such that their free ends are substantially at a same distance from the longitudinal axis A (with the possible exception of the protrusions in the vicinity of the ends of the central core 5 which may be short), in order to inscribe the applicator within a substantially cylindrical outside general envelope. The fact that the protrusions have different lengths makes it possible to influence their flexibility: a longer protrusion will be more flexible than a shorter protrusion (it will bend under the effect of a same force applied to its end).

The applicator can thus be inscribed within a cylinder having a diameter comprised between 6 mm and 10 mm. Applicators inscribed within an outer envelope of 7 mm to 9.5 mm may also be envisioned. An optimum value, in terms of effectiveness and comfort of application, is 8 mm or approximately 8 mm.

According to the various embodiments of the invention and the various of configurations of protrusions that may be used, the length of the protrusions (dimension measured along their main direction of extension, typically radially relative to the longitudinal axis A) may be comprised between 0.2 mm and 0.5 mm for example between 0.24 mm and 0.40 mm.

Figure 3:
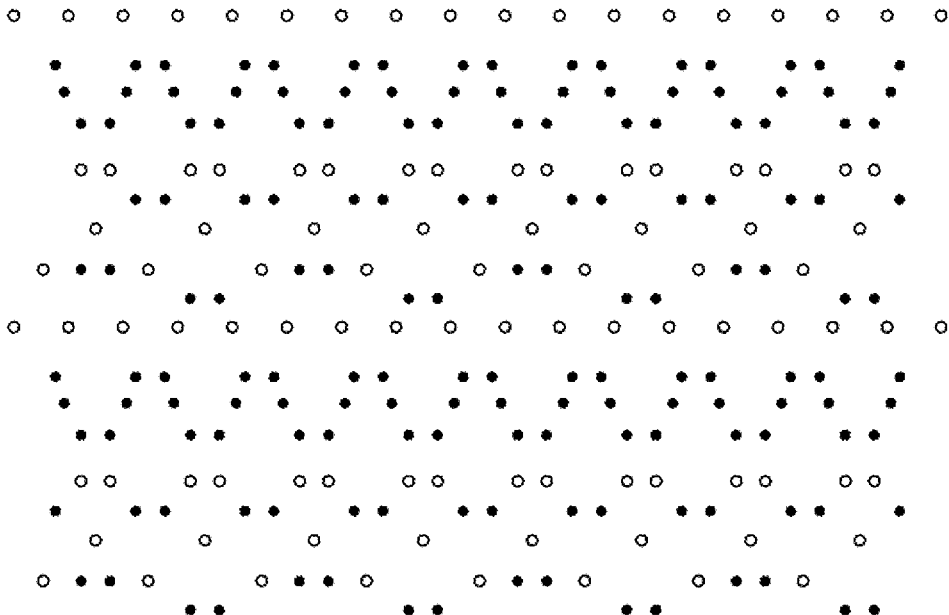
FIG. 3 represents, in a concept diagram, an example of distribution of protrusions that may be obtained with a cosmetic product applicator in accordance with the embodiment of FIG. 1.

FIG. 3 represents, according to a concept diagram, the distribution of the fixed protrusions of the applicator of FIG.

1. In FIG. 3, the outer envelope within which the applicator is inscribed, has been developed flat. The fixed protrusions are represented by circles (unfilled) while the movable protrusions have been represented by filled circles. In the example arrangement represented, there has thus been created, in the sweeping direction of the applicator, a succession of alignments of fixed protrusions and of movable protrusions. The eyelashes are thus successively combed by fixed protrusions, which separate the eyelashes, and movable protrusions which by adapting themselves to the eyelashes and to the movements of the user confer a lateral combing effect (in the longitudinal direction of the applicator) which improves the application of the cosmetic product (for example improves the elongation of the eyelashes or their volume).

Figure 4:
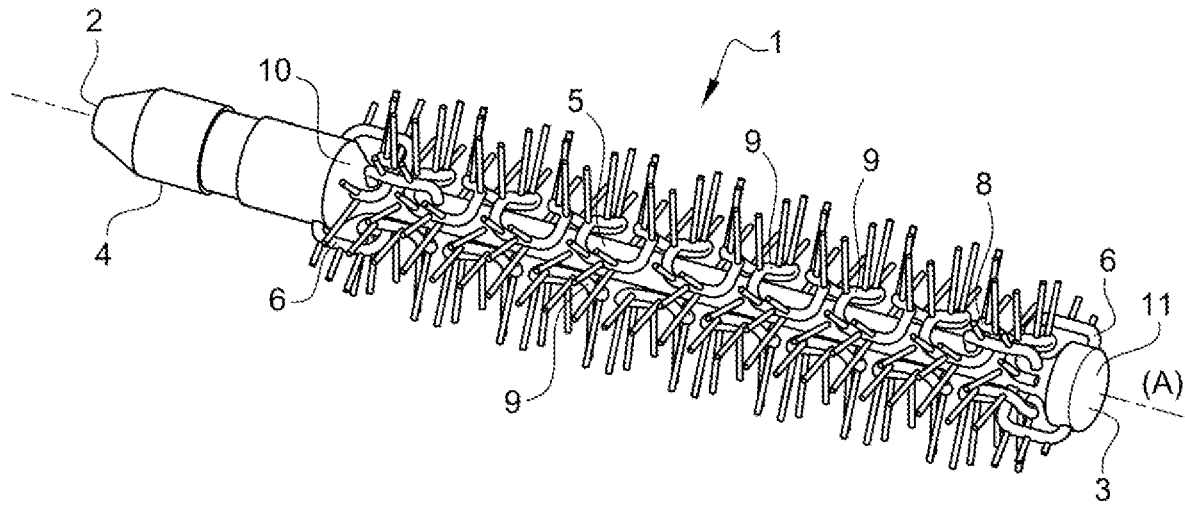
FIG. 4 shows, in a diagrammatic view in three dimensions, an applicator in accordance with another embodiment of the invention.

FIG. 4 represents a second embodiment of an applicator in accordance with the invention. This embodiment is similar to that of FIG. 1, with the exception of the configuration of the links 6 providing the connection between the fixed part of the applicator and its movable part. Reference may thus be made to the description of the embodiment of FIG. 1, with the exception of the differences detailed below.

Thus, the applicator of FIG. 4 is differentiated from that of FIG. 1 in that the chains 8 of the movable part are only fastened to the fixed part at the location of the central core 5, that is to say at the location of the proximal end 10 of the core, situated in the vicinity of the grip part and thus of the interface with the joining member 4 in the example shown, and of a distal end 11 corresponding to the second end 3 of the applicator. Thus, at each of the ends of the core, a single link 6 is provided for each of the rows of loops of the chains 8. Thus, in the example shown, only the endmost loop of each row of each chain is connected to the fixed part. For this the central core comprises four links at each end, regularly distributed around the central core 5, of which the longitudinal disposition is configured such that for the link considered passes through the first entire loop 9 of a row of loops 9. This enables the chains of the movable part to deform, and to curve slightly, on application of a cosmetic product to the user's eyelashes. This flexibility improves the comfort of application, in particular when a relatively rigid material is used. This is generally the case for plastics materials usable in an additive manufacturing process.

Figure 5:
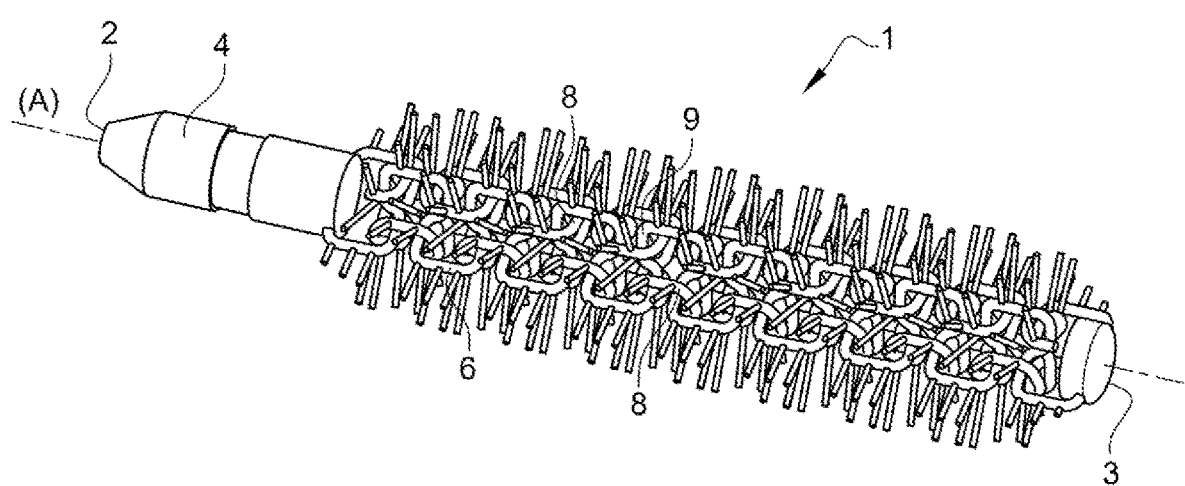
FIG. 5 shows, in a diagrammatic view in three dimensions, an applicator in accordance with another embodiment of the invention.

FIG. 5 represents a third embodiment of an applicator in accordance with the invention. This embodiment is in part similar to that of FIGS. 1 and 4, with the exception of the configuration of the fixed part of the applicator. Reference may thus be made to the description of the embodiment of FIG. 1, with the exception of the differences detailed below.

Thus, the applicator of FIG. 5 is different from that of FIG. 1 in that it does not comprise a central core. The fixed part of the applicator is thus formed from one or more strands (in this case two strands in the example shown) each forming a chain of open links 6.

The chains of links are connected to the joining member 4 and are furthermore connected to the second end 3 of the applicator 1.

Here, the chains of links have the same geometry as the chains 8 of loops 9 of the movable part of the applicator. The chains of links thus have two rows of links provided in substantially orthogonal planes.

The open links of the chains of links are interlaced with the open loops of the movable part.

The lack of core and the configuration of the fixed part (the open links having the capability for deforming more easily than a closed link) gives the whole of the applicator high flexibility. In particular, the fixed part and the movable part can both deform, and curve. The movable part is furthermore particularly free to move not only longitudinally but also in the other directions, which increases the sensation of flexibility and adaptability of the applicator when used.

Figure 6:
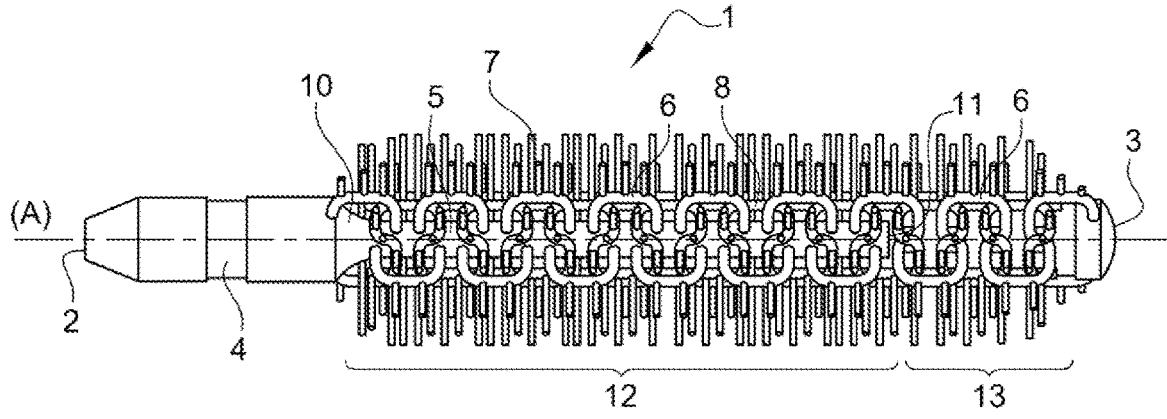
FIG. 6 shows, in a diagrammatic view in three dimensions, an applicator in accordance with another embodiment of the invention.

FIG. 6 represents an applicator in an embodiment which may be described as a configuration intermediate between that of FIG. 1 and that of FIG. 5. Thus, the applicator for cosmetic product of FIG. 6 comprises a central core 5, which only extends over part of the length of the applicator. Links 6 are formed over the whole length of the central core 5. Each row of links is continued, beyond the distal end 11 of the core, by a chain of links which extends to the second end 3 of the applicator.

It is thus possible to form an applicator 1 which has two longitudinal portions, that is to say a first longitudinal portion 12 and a second longitudinal portion 13, the first longitudinal portion 12 having greater rigidity, in particular greater resistance to bending, than the second longitudinal portion 13. For example, the first longitudinal portion 12 can form the main portion of the applicator of the application of cosmetic product to the eyelashes, while the second longitudinal portion 13 can form a touch-up brush or enable a particular local effect (extension, curvature, etc.) to be obtained.

On account of their complex configurations, the applicators described above are advantageously (or even necessarily, for certain embodiments) manufactured by an additive manufacturing technique. Additive manufacturing by powder bed fusion is the preferred technique for forming the applicator according to the present invention.

The applicator is advantageously formed from plastic. In some embodiments, the applicator is formed from a single material. In other embodiments, the fixed part and the movable part are formed from two different materials.

A polyamide, preferably an aliphatic polyamide, for example polyamide 11, may be used to form the fixed part and/or the movable part. Polypropylene may be used to form the fixed part and/or the movable part.

The invention thus developed provides an applicator for cosmetic product, in particular a mascara applicator, enabling high quality application with simple manipulation. The comfort of use, in particular the sensation of flexibility of the applicator, is maintained despite the possible use of a hard material, for example a rigid plastic compatible with an additive manufacturing process.

The invention claimed is:

1. An applicator for cosmetic product having an elongate general shape and extending along a longitudinal axis defining a longitudinal direction, the applicator comprising:

a fixed part, configured to be rigidly connected to a grip part or formed as a single unit with said grip part, the fixed part comprising a central core extending along the longitudinal axis; and a movable part configured to move in slight transverse back- and forth movements in relation to the fixed part;

the movable part comprising at least one chain comprising a strand forming a plurality of open loops, said at least one chain extending substantially parallel to the longitudinal axis;

the fixed part comprising at least two links;

at least two of said plurality of open loops on each of said at least one chain being passed through by one of said at least two links, such that each of said at least one chain is fastened with at least one degree of freedom to the fixed part, enabling relative movement of said at least one chain in relation to the fixed part in the longitudinal direction;

wherein the central core comprises a first end and a second end, the first end and the second end each bearing one of the at least two links and the central core carries at least one row of links, including the at least two links, and extending over a whole length of the central core, in the longitudinal direction, and is configured such that each loop of each chain of the movable part is passed through by two links of said at least one row of links.

2. The applicator according to claim 1, wherein:

each of said at least one chain has a first row of open loops and a second row of open loops, the first row of open loops located in a first plane parallel to the longitudinal axis, the second row of open loops located in a second plane parallel to the longitudinal axis, distinct from said first plane.

3. The applicator according to claim 2, wherein:

said at least one chain comprises two chains.

4. The applicator according to claim 1, wherein:

the movable part comprises protrusions.

5. The applicator according to claim 4, wherein:

the protrusions are oriented substantially perpendicularly to the longitudinal axis.

6. The applicator according to claim 4, wherein:

the fixed part comprises protrusions and the protrusions of the fixed part differ in size and/or shape from the protrusions of the movable part.

7. The applicator according to claim 4, wherein:

each protrusion is substantially cylindrical or prismatic and has a length comprised between 0.2 mm and 0.5 mm.

8. The applicator according to claim 4, wherein:

each protrusion of the movable part comprises a free end remote from the longitudinal axis, said applicator being inscribed within an outer envelope defined by the free ends of the protrusions, said envelope being substantially cylindrical and having a diameter of between 6 mm and 10 mm.

9. The applicator according to claim 4, wherein:

each protrusion of the movable part comprises a free end remote from the longitudinal axis, said applicator being inscribed within an outer envelope defined by the free ends of the protrusions, said envelope being substantially cylindrical and having a diameter of between 7 mm and 9 mm.

10. The applicator according to claim 4, wherein:

each protrusion of the moveable part comprises a free end remote from the longitudinal axis, said applicator being inscribed within an outer envelope defined by the free ends of the protrusions, said envelope being substantially cylindrical and having a diameter of 8 mm.

11. The applicator according to claim 4, wherein:

the fixed part and/or the movable part is produced from polyamide.

12. The applicator according to claim 4, wherein:

the fixed part and/or the movable part is produced from polyamide 11.

13. The applicator according to claim 4, wherein:

the fixed part and/or the movable part is produced from polypropylene.

14. A method for manufacturing an applicator according to claim 1, said method comprising: forming the applicator from a plastic material via powder bed fusing.

* * * * *